(12) United States Patent
Barnett

(10) Patent No.: US 10,220,910 B1
(45) Date of Patent: Mar. 5, 2019

(54) HANDLEBAR DRIVE FOR BICYCLE

(71) Applicant: Robert Barnett, Choctaw, OK (US)

(72) Inventor: Robert Barnett, Choctaw, OK (US)

( * ) Notice: Subject to any disclaimer, the term of this patent is extended or adjusted under 35 U.S.C. 154(b) by 56 days.

(21) Appl. No.: 15/731,151

(22) Filed: Apr. 26, 2017

Related U.S. Application Data

(60) Provisional application No. 62/391,634, filed on May 5, 2016.

(51) Int. Cl.
  *B62M 1/00* (2010.01)
  *B62M 1/12* (2006.01)
  *B62M 1/36* (2013.01)

(52) U.S. Cl.
  CPC .............. *B62M 1/12* (2013.01); *B62M 1/36* (2013.01)

(58) Field of Classification Search
  CPC ................................. B62M 1/12; B62M 1/36
  USPC ......................................................... 280/233
  See application file for complete search history.

(56) References Cited

U.S. PATENT DOCUMENTS

| | | | | |
|---|---|---|---|---|
| 651,941 A | * | 6/1900 | Von Wedel | B62K 3/002 24/599.9 |
| 2,374,432 A | * | 4/1945 | Hoefner | A01D 34/26 56/272 |
| 2,638,359 A | * | 5/1953 | Crumble | B62M 1/10 280/215 |
| 3,760,905 A | * | 9/1973 | Dower | F03G 5/00 185/10 |
| 5,601,301 A | | 2/1997 | Liu | |
| 5,762,350 A | | 6/1998 | Jolly | |
| 5,775,708 A | | 7/1998 | Heath | |
| 5,820,151 A | * | 10/1998 | Cheng | B62M 1/12 280/233 |
| 6,193,253 B1 | | 2/2001 | Barnett | |
| 6,257,607 B1 | * | 7/2001 | Franks | B62M 1/14 280/242.1 |
| 6,264,224 B1 | * | 7/2001 | Phillips | B62M 1/12 280/234 |
| 8,939,457 B2 | | 1/2015 | Poor | |
| 2011/0241305 A1 | | 10/2011 | Pi | |

* cited by examiner

*Primary Examiner* — Jacob D Knutson
(74) *Attorney, Agent, or Firm* — Randal D. Homburg

(57) ABSTRACT

A supplemental drive mechanism for a bicycle or other manually compelled pedal vehicle providing a reciprocating handlebar assembly, a cable drive, a transmission assembly, and a supplemental drive assembly, wherein a forced reciprocating movement of the handlebar by a push-pull motion of a rider by the upper body, by and through the transmission, results in a singular direction rotational movement of a supplemental chain sprocket incorporated into the rear wheel drive of the bicycle in addition to a rotational pedal movement the rider by the lower body as applied to the pedals of the bicycle in a forward direction.

4 Claims, 6 Drawing Sheets

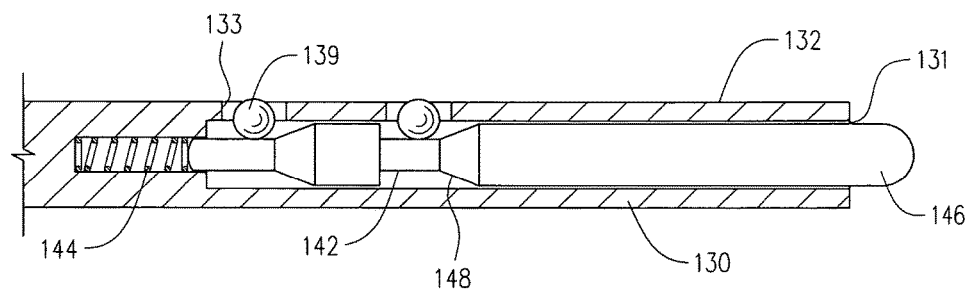
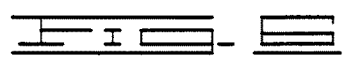
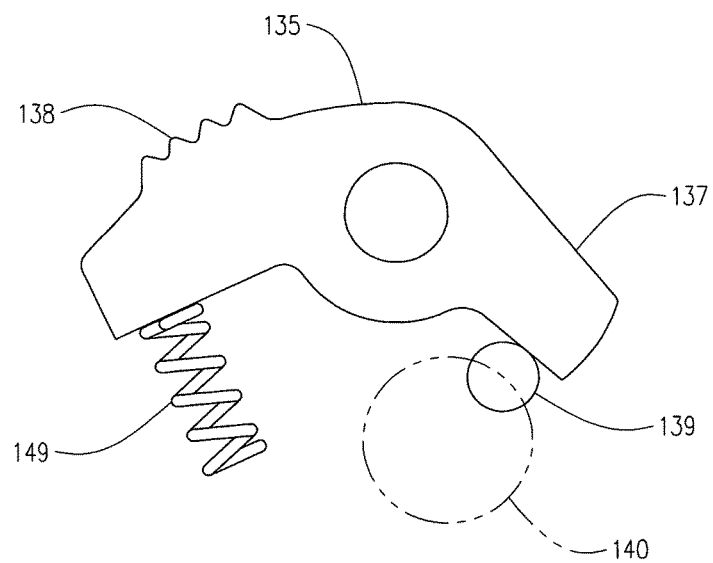
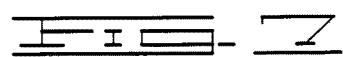

HANDLEBAR DRIVE FOR BICYCLE

CROSS REFERENCE TO RELATED APPLICATIONS

Applicant claims the benefit of provisional patent application No. 62/391,634, filed on May 5, 2016, by the same inventor.

I. BACKGROUND OF THE INVENTION

I. Field of Invention

A supplemental drive mechanism for a bicycle or other manually compelled pedal vehicle providing a reciprocating handlebar assembly, a cable drive, a transmission assembly, a clutch assembly and a supplemental drive assembly, wherein a forced reciprocating movement of the handlebar by a push-pull motion of a rider by the upper body, by and through the transmission, results in a singular direction rotational movement of a supplemental chain sprocket incorporated into the rear wheel drive of the bicycle in addition to a rotational pedal movement the rider by the lower body as applied to the pedals of the bicycle in a forward direction. A clutch allows for the selective use of the supplemental drive mechanism.

2. Description of Prior Art

A preliminary review of prior art patents was conducted by the applicant which reveal prior art patents in a similar field or having similar use. However, the prior art inventions do not disclose the same or similar elements as the present supplemental handlebar drive apparatus, nor do they present the material components in a manner contemplated or anticipated in the prior art.

In U.S. Patent Application No. 2011/0241305 to Pi, a secondary handlebar power assembly on a bicycle is disclosed, which utilizes a full lateral rotation of the handlebars in unison to provide a worm-drive gear rotation of a sprocket to compel a chain to supplement the pedal drive of a bicycle. The drive assembly, the handlebar movement and the transmission of the present handlebar drive apparatus are distinguishable from the components of Pi. In both U.S. Pat. No. 8,939,457 to Poor and U.S. Pat. No. 5,820,151 to Cheng, a front wheel drive apparatus is supplied by handlebar movement, with Poor being supplied by a reciprocating movement of the handlebar. Neither Poor of Cheng disclose a transmission, a cable drive mechanism, nor other similar components disclosed by the present supplemental handlebar drive apparatus. A previous patent by Barnett, U.S. Pat. No. 6,193,253, disclosed a set of rotating handlebars operated by a rotational cranking motion of the arms, directly converting the rotational motion of the handlebars into a direct chain drive of a supplemental chain sprocket. The prior Barnett patent had no transmission, nor did the handlebars operate in a bidirectional reciprocating motion converted to a singular rotational movement of a lower sprocket supplementing the pedal drive of the bicycle.

II. SUMMARY OF THE INVENTION

Normal or conventional pedal driven vehicles use pedals operated by the rider's feet to compel these bicycles, tricycles and other pedal driven vehicle in a forward motion. The upper body of the rider remains basically dormant, except for steering the pedal driven vehicle. In searching the prior art above, it is noted that several prior art inventions have employed mechanical improvements that utilize the otherwise dormant upper body to provide a secondary mechanical means to add to the human activity that drives the vehicles. These can include four wheeled vehicles, pedal boats, or even toy pedal cars that children would use. This not only provides additional power, but also provides a source of exercise for the upper body in addition to the already present workout directed to the lower body.

A secondary drive for a bicycle or other self-propelled pedal-driven vehicle, using a reciprocating motion on the handlebars to supplement the primary pedal drive is produced by the components in the drawings below and the description provided in the specification and claims which provide a selective optional secondary means of propulsion to the pedal-driven vehicle. Using a forced forward and rearward reciprocating motion, a primary cable drive provides a bidirectional movement of a rocker arm integrating through a gear drive assembly on a transmission axle within the transmission assembly, converting the forced bidirectional movement of the rocker arm into a singular direction rotation of the transmission axle and an attached and laterally extending secondary drive sprocket in the same direction as the rider is operating the primary drive sprocket activated by the rotational pedal movement of the bicycle, cooperating the reciprocating drive force produced by upper body with the rotational drive force produced by the lower body to move the pedal-drive vehicle in a forward motion.

III. DESCRIPTION OF THE DRAWINGS

The following drawings are submitted with this utility patent application.

FIG. 6 is a cross-sectional view of the pawl and the ball bearing below the pawl lever.

FIG. 7 is a cross-sectional view of the clutch pin indicating the ball bearings within the pawl recesses behind the pawl ramps.

IV. DESCRIPTION OF THE PREFERRED EMBODIMENT

A reciprocating handlebar auxiliary drive apparatus 10 for a bicycle A or other human-propelled pedal-driven vehicle, using a reciprocating motion on the handlebars F to supplement the primary pedal drive, is produced by a push and pull motion of the handlebars. For purposes of this specification, a human-propelled pedal-driven vehicle will be referenced as a bicycle, but may include an upright or recumbent bicycle, tricycle, pedal car, human powered aircraft or pedal craft used in water activity.

Figure 1:
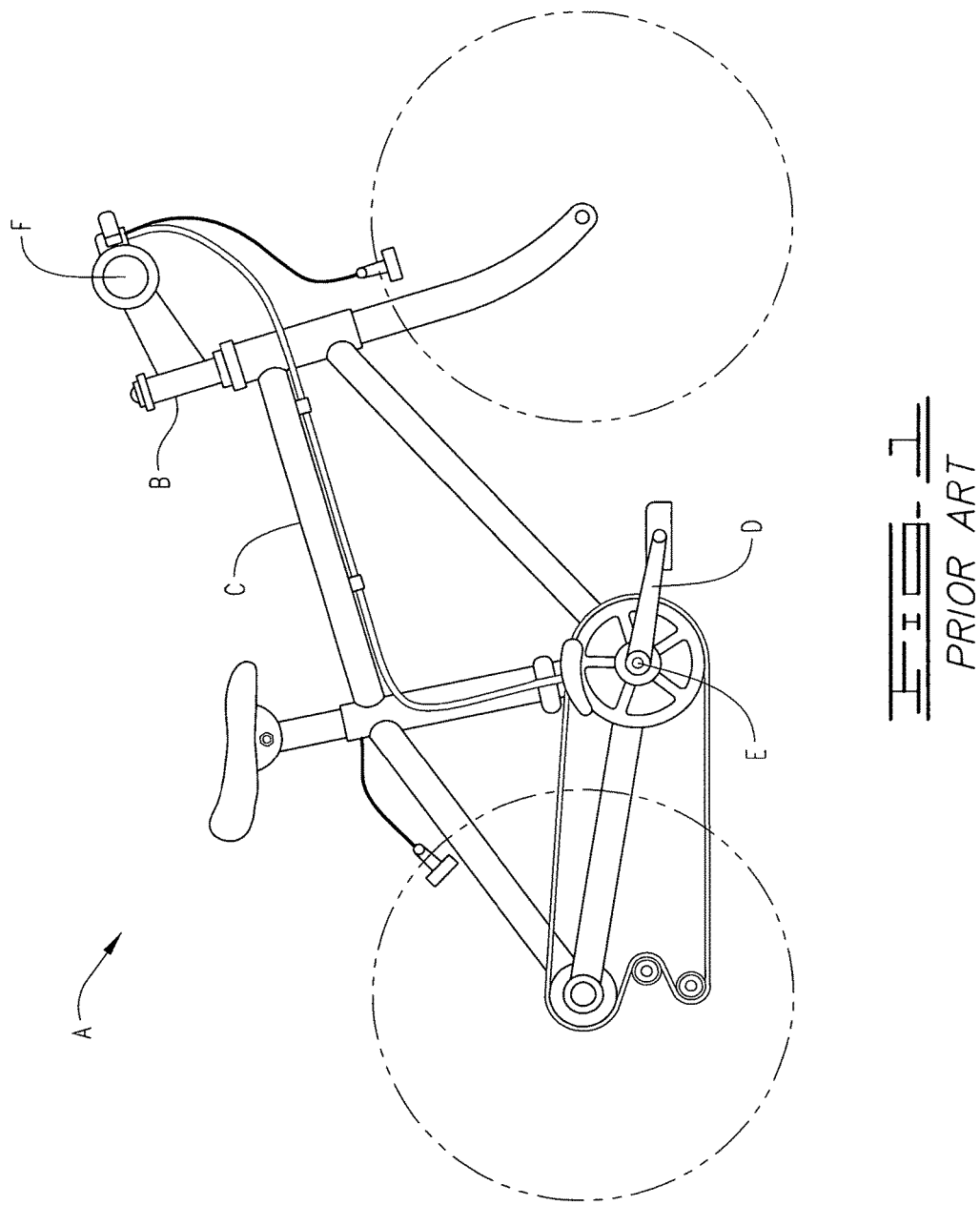
FIG. 1 is a side view of a prior art bicycle which is modified to present a secondary handlebar drive apparatus.

The reciprocating handlebar auxiliary drive apparatus 10 comprises a reciprocating handlebar assembly 20, a reciprocating drive cable 70, a transmission assembly 100, a clutch assembly 80 to selectively engage the apparatus to augment the pedal drive or to disengage to use only the pedal drive, and a supplemental drive assembly 200 working in conjunction with the pedal drive system already on the bicycle. The reciprocating handlebar auxiliary drive apparatus 10 can be used to compel the bicycle movement in cooperation with the pedal drive system, or disengaged with only the pedal system being operable, without affecting the steering of the bicycle. FIG. 1 illustrates the components of a bicycle A comprising essentially a bicycle frame C, a forward handlebar stem B mounting a set of handlebars F, bilateral pedals D upon a lower pedal axle E and a chain drive chain. FIGS. 2-5 further illustrate the components of the reciprocating handlebar auxiliary drive apparatus applied to a bicycle. The reciprocating handlebar assembly 20 may be applied to supplement a fixed handlebar with the fixed handlebar only serving to steer the bicycle and the handlebar assembly 20 to compel the bicycle A, not shown.

Figure 3:
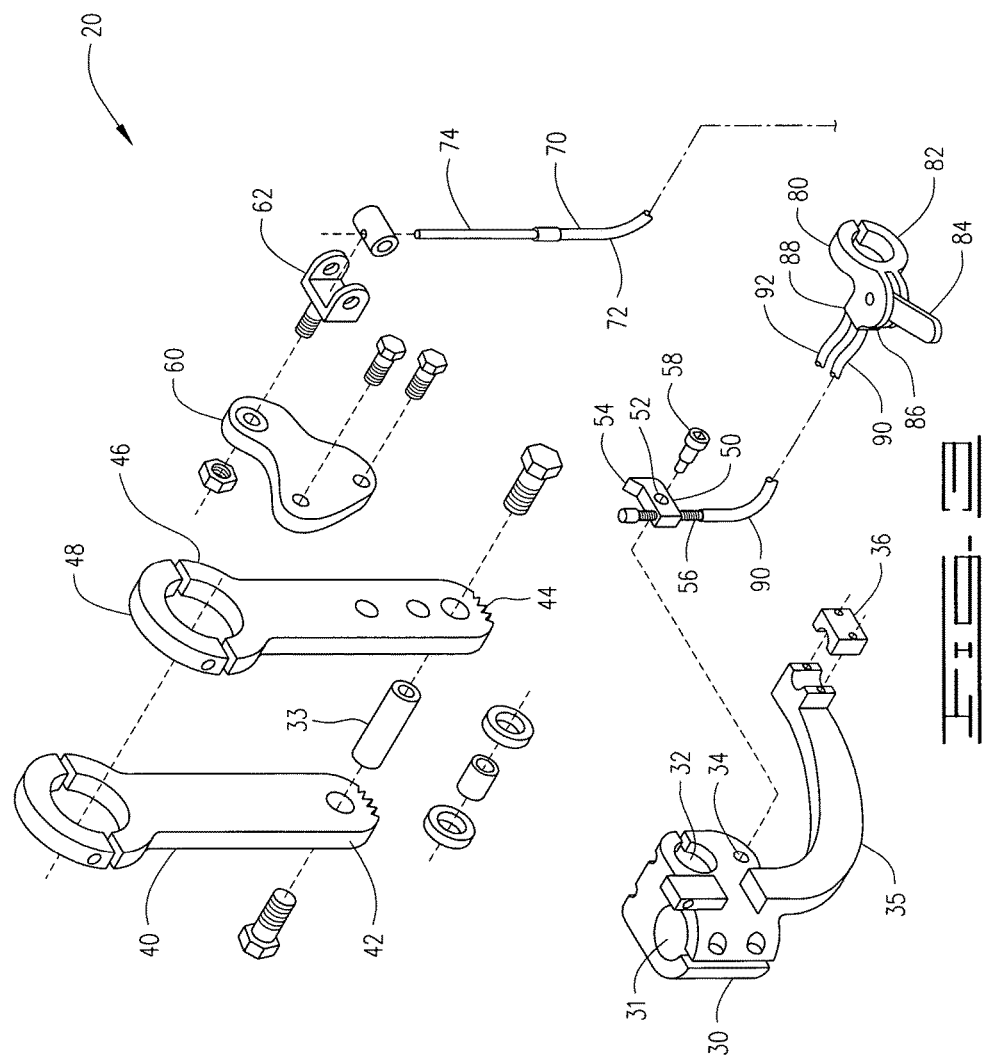
FIG. 3 is an exploded view of the reciprocating handlebar assembly, drive cable and clutch assembly.

The handlebar assembly 20, FIG. 3, defines a base block 30 comprising a vertical stem bore 31 securing to the forward handlebar stem B, the base block 30 having a transverse drive lever bore 32, a transverse clutch pin bore 34, and a fixed a lower cable sleeve stabilizer arm 35. A respective lower end 42 of a pair of drive lever arms 40 are attached to the base block 30 by a common rocker pin 33 providing limited reciprocating movement between the pair of drive lever arms 40 and the base block 30. At least one drive lever arm 40 includes lower clutch teeth 44 extending below the lower end 42. Both of the drive lever arms 40 define an upper end 46 with handlebar clamps 48 attaching to the common handlebar F. The reciprocating movement of the lever arms 40 is accomplished by a simultaneous push-pull movement of the handlebars F.

Further attaching to the handlebar F is the clutch assembly 80, although the clutch assembly 80 may be located in alternate locations on the bicycle frame C and is contemplated within the scope of this apparatus 10. For purposes of the illustrations and specification, the handlebar mounted embodiment is discussed, although adaptations to the following components could provide mounting of the clutch assembly 80 to other accessible and convenient parts of the bicycle frame C. The clutch assembly 80 includes a clutch mounting base 82 attached to the handlebar F. Extending from the clutch mounting base 82 is a clutch lever 84 which is selectively pivotally moved from an engaged to a disengaged position. Attached to the clutch lever 84 is a handlebar clutch cable mount 86 and a transmission clutch cable mount 88. Emanating from the respective clutch cable mounts 86, 88 is a respective handlebar clutch cable 90 and a transmission clutch cable 92, the handlebar clutch cable 90 further directed to the handlebar assembly 20 and the transmission clutch cable 92 further directed to the transmission assembly 100 as indicated below.

A handlebar clutch arm 50 pivotally attaches through a handlebar clutch arm bore 52 into the transverse clutch pin bore 34 of the base block 30 by a clutch arm pin 58, and defines an "active" and an "inactive" position. The handlebar clutch arm 50 defines a pawl 54 and a clutch cable attachment 56, attaching the handlebar clutch cable 90 to the clutch cable attachment 56, thereby providing the handlebar clutch cable 90, when the clutch lever is in the "inactive" position, forcing the pawl 54 of the handlebar clutch arm 50 upward into a lock position, between the lower clutch teeth 44 extending from the lower end 42 of the at least one drive lever 40, halting the movement of the handlebars F and drive levers 40 from reciprocal movement into a locked stationary position. In the "active" position, the drive levers 40 and the handlebars F are allowed to reciprocate. The active position of the clutch lever 84 also influences the movement of the transmission assembly 100 as indicated below.

The reciprocating drive cable 70 defines a cable sleeve 72, a first end 74 and a second end 76. The first end 74 of the reciprocating drive cable 70 attaches to an upper drive cable clamp 62 which is defined within an extending drive arm 60 attached to at least one of the drive levers 40 within the reciprocating handlebar assembly 20. The drive cable 70 can be pushed through the cable sleeve 72 or pulled through the cable sleeve 72, also in a reciprocating motion. Thus, when the handlebars F are pushed or pulled, the drive cable 70 is also pushed or pulled in a similar connected manner. The cable sleeve 72 is held stationary by attachment within a cable sleeve clamp 36 incorporated within the fixed a lower cable sleeve stabilizer arm 35 which extends from the base block 30 while the reciprocating drive cable 70 is allowed to be pushed or pulled freely and independently through the stationary cable sleeve 72. The second end 76 of the drive cable 70 will be defined and indicated below as it relates to movement of the components within the transmission assembly 100 and supplemental drive assembly 200.

Figure 4:
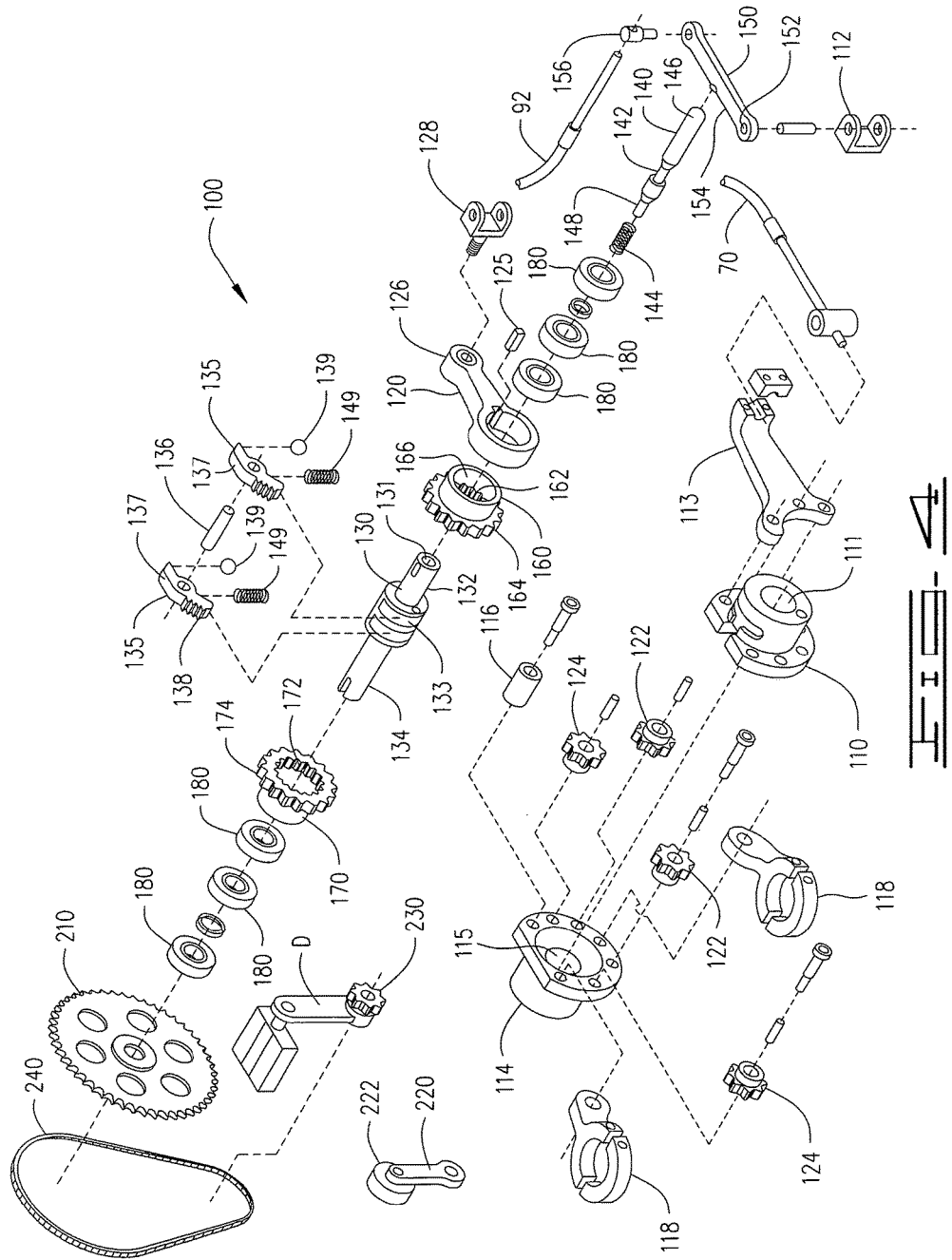
FIG. 4 is an exploded view of the supplemental drive assembly and transmission assembly.
Figure 5:
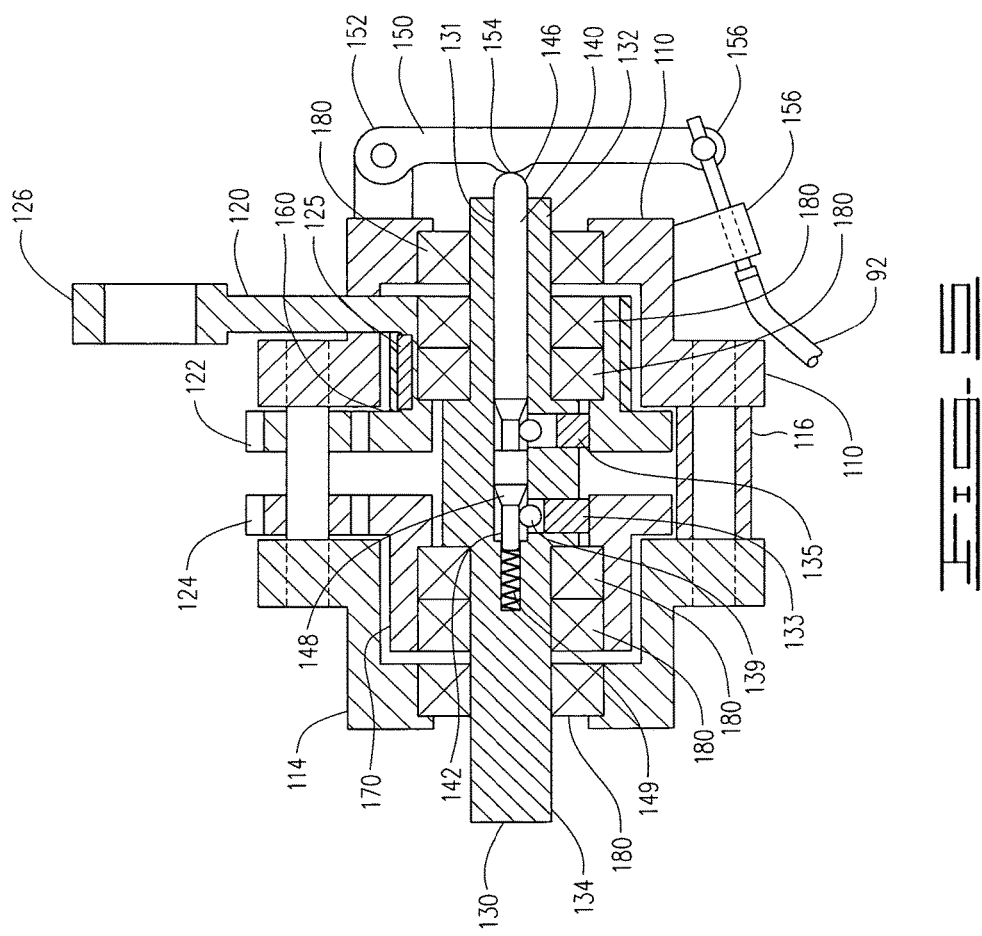
FIG. 5 is a cross-sectional view of the transmission assembly.

The basic function of the transmission assembly 100, shown in FIGS. 2-5, is to convert a reciprocating motion of the drive cable 70 compelled by reciprocating movement of the reciprocating handlebar assembly 20 into a uniform directional rotational motion utilized by the supplement drive assembly 200. In other words, a push-pull motion acting on one side of the transmission assembly 100 is changed into a singular direction rotational motion of a transmission axle 130 across the transmission assembly 100 to which is attached the supplemental drive assembly 200. Therefore, an embodiment of the transmission assembly 100 disclosed in FIGS. 3-5, is the transmission assembly 200 and components recognized by actual use and testing as a working and suitable assembly of components to accomplish the purpose of the transmission assembly 100 in the present apparatus 10, although other transmission sources known in the prior art could substitute to provide a similar conversion function.

The present transmission assembly 100, as indicated in FIGS. 4-5, defines an input housing member 110 defining a transverse axle bore 111, a clutch arm mount 112 and a cable sleeve arm 113, and an output housing member 114 defining a transverse axle bore 115, at least one housing spacer 116 and a frame mounting bracket 118, FIG. 4. The frame mounting bracket 118 attaches the transmission assembly 100 to the bicycle frame C in a manner shown in FIG. 2. The housing spacer 116 is provided to connect and separate the input housing 110 from the output housing 114 leaving a fixed gap between the input housing 110 and output housings 114 subsequent to assembly. A gear drive lever 120 is pivotally mounted within the input housing 110 upon an input drive gear 160 by a drive lever key 125, the gear drive lever 120 extending a drive lever extension 126 above the input housings 110 with a drive cable connector 128 attaching the second end 76 of the reciprocating drive cable 70, FIGS. 4-5. The reciprocating limits of the gear drive lever 120 in the transmission assembly 100 be the same distance as the resultant reciprocating limits of the drive lever 40 in the handlebar assembly 20, so that the reciprocating drive cable 70 movement is equal during operation to the reciprocating movement of the handlebar assembly 20. It is also contemplated that the transmission axle 130 could be a modified embodiment of the pedal axle E, including the clutch pin 140 and its accompanying features, not shown.

It should be noted that the reciprocating drive cable 70 does not necessarily limit the embodiment to just the component described herein. A rod, a chain, a strong cord, a belt, a piston or other substantial equivalent means which would serve the same function as the reciprocating drive cable 70 provided it can transfer the reciprocating motion of the extending drive arm 60 of the handlebar drive assembly to the gear drive lever 120.

A transmission axle 130 transverses and extends through both transverse axle bores 111, 115 of the input and output housings 110, 114, with the transmission axle 130 defining an input end 132, extending from the input housing 110, and an output end 134, extending from the output housing 114, FIGS. 4-5. The transmission axle 130 includes a transverse bore 131 partially through the axle 130 though the input end 132, a pair of pawl slots 133 within the transmission axle 130 between the input end 132 and the output end 134, including a respective resiliently retractable pawl 135, transversely and pivotally secured by a respective pawl rocker pin 136, each pawl defining a pawl lever 137 and upper pawl teeth 138 independently pivotally attached within each pawl slot 133. The pawl teeth of each respective pawl 135 independently rocks in and out of the respective pawl slot 133, with each pawl lever 137 being urged outward by a pawl spring 149, but retracting inwards during certain movements of the transmission assembly components. Within the transverse bore 131 is inserted a clutch pin 140, defining two pawl recesses 142 with respective pawl ramps 148, a clutch spring 144 pushing the clutch pin 140 towards the input end 132 of the transmission axle 130, a clutch pin extension 146 extending beyond the input end 132 of the transmission axle 130. The clutch pin 140 inserts within the transverse bore 131 of the transmission axle 130, FIG. 5, with the clutch pin spring 144 urging the clutch pin 140 outward, extending the clutch pin extension 146 from the transmission axle 130. When the clutch pin extension 146 is extended, the pawl recesses 142 of the clutch pin 140 are aligned below the pawl lever 137 below which a ball bearing 139 is retracted within the respective pawl recess 142 of the clutch pin 140, FIGS. 6-7. When the clutch pin extension 140 is retracted within the transmission axle 130, the pawl recesses 142 of the clutch pin 140 are offset, and the pawl levers 137 are forced outward and held rigid from the transmission axle 130 in a static position, forcing the ball bearings 139 upward, elevated by the pawl ramps 148 and held by the clutch pin 140, FIG. 6, preventing retraction of the ball bearings 139 forcing the pawl lever 137 upward, resulting in the transmission assembly being in an "inactive" or "neutral" position. The pawl teeth 138 are lowered when the pawl levers 137 are elevated. Movement of the pawls 135 within the pawl slots 133 in the transmission axle 130 allowing them to retract and elevate results in the pawls 135 being located in an "active" or "drive" position.

The transmission axle 130 further attaches the input drive gear 160 and an output drive gear 170 attached to the transmission axle 130 by a respective bearing 180. See FIGS. 4-5. The bearing 180 may provide more than one bearing as assembly. The input drive gear 160 is installed upon the axle 130 from the input end 132, while the output drive gear 170 is installed upon the transmission axle 130 from the output end 134. The input drive gear 160 further defines a set of inner rachet teeth 162, outer drive gear teeth 164 and an inner bearing cavity 166 within which a bearing 180 is attached. The output drive gear 170 further defines a set of inner rachet teeth 172, outer drive gear teeth 174 and an inner bearing cavity 176 within which a bearing 180 is attached. When installed, the inner drive teeth 162 of the input drive gear 160 are positioned over the transmission axle 130 above the pawl 135 extending from the transmission axle 130 nearest the input end 132, with the pawl 135 on the input end 132 extending the pawl teeth 138 upward and resiliently engaging the inner rachet teeth 162 of the input drive gear 160 in a rachet/pawl engagement, engaged in one direction and disengaged in an opposite direction. When installed, the inner rachet teeth 172 of the output drive gear 170 are also positioned over the transmission axle 130 above the pawl 135 extending from the transmission axle 130 nearest the output end 134, with the pawl 135 on the output end 134 extending upward and resiliently engaging the inner sprocket teeth 172 of the output drive gear 170 in a rachet/pawl engagement, engaged in one direction and disengaged in an opposite direction. Each pawl 135 independently allows the respective input or output drive gear 160, 170, to move the transmission axle 130 in a singular rotational axis. The gear drive lever 120 further attaches to the input drive gear 160, as previously disclosed, with the drive lever extension 126 extending above the assembled input and output housing members 110, 120, in an upright position.

When the drive lever extension 126 is pushed, the input drive gear 160 engages and rotates the transmission axle 130 in a singular rotational direction through engagement of the inner rachet teeth 162 of the input drive gear 160 with the corresponding pawl 135. When the drive lever extension 126 is pulled, the input drive gear 160 disengages from the pawl 135 with the inner sprocket teeth 162 of the inner drive gear 160, instead engaging the outer drive gear teeth 164 with a plurality of forward idler gears 122 and reverse idler gears 124 installed between the input housing member 110 and the output housing member 114, these forward and reverse idler gears 122, 124, reversing the direction of the output drive gear 170 through movement of the forward idler gears 122 and reverse idler gears 124 forcing rotation of outer drive gear teeth 174 of the output drive gear 170, further resulting in the engagement of the inner sprocket teeth 172 of the output drive gear 170 engaging the respective pawl 135, ultimately rotating the transmission axle 130 in the same direction as occurs when the drive lever extension 126 is pushed. A cross-sectional representation of these assembled components is depicted in FIG. 5, while an expanded component diagram demonstrates the relative assembly in FIG. 4. Thus, no matter what direction the drive lever extension 126 is moved, forward or reverse, the transmission axle 130 always spins the same direction, either through direct force drive rotation, or reverse geared force drive rotation.

The transmission clutch pin 140 is activated by the same clutch assembly 80 in response to the movement of the clutch lever 84, acting upon the transmission clutch cable 92 as previously indicated while the clutch lever 84 is in the "active position". This activation of the clutch pin 140 is performed by the inclusion of a transmission clutch arm 150 defining a clutch arm hinge 152 pivotally attaching to the clutch arm mount 112, the transmission clutch arm 150 defining an inner margin 154 directed towards the clutch pin extension 146 subsequent to installation. A clutch cable attachment 156 secures the transmission clutch cable 92 to the transmission clutch arm 150. In the inactive position, the inner margin 154 of the transmission clutch arm 150 is forced against the clutch pin extension 146, forcing the clutch pin 140 inward against the force of the clutch pin spring 144, forcing the ball bearings 139 up the pawl ramps 148 in turn forcing the pawl levers 137 of both of the pawls 135 hingeably attached within the transmission axle 130 upwards and preventing retraction. The respective pawl teeth 138 are lowered, and disengaged from the respective inner rachet teeth 162, 172, of the respective input and output gear 160, 170. In this position, the transmission axle 130 freely rotates and the rider is able to pedal backwards, but all gear movement is halted and the reciprocating movement of the gear drive lever 120 is not involved in the operation of the transmission drive assembly 100. Since the reciprocating handlebar drive 10 is inoperable, any movement of the gear drive lever 120 is not conducted. When the clutch lever 84 is in the "active" position, pivotal movement of the pawls 135 within the pawl slots 133 in the transmission axle 130 is restored, allowing them to retract and elevate restoring the function and operation of the transmission assembly 100. Therefore, the clutch assembly 80 allows for a rider to elect use of the handlebar drive assembly or not by simply engaging or disengaging the clutch lever 84, most conveniently located on the handlebar F, FIG. 2.

Figure 2:
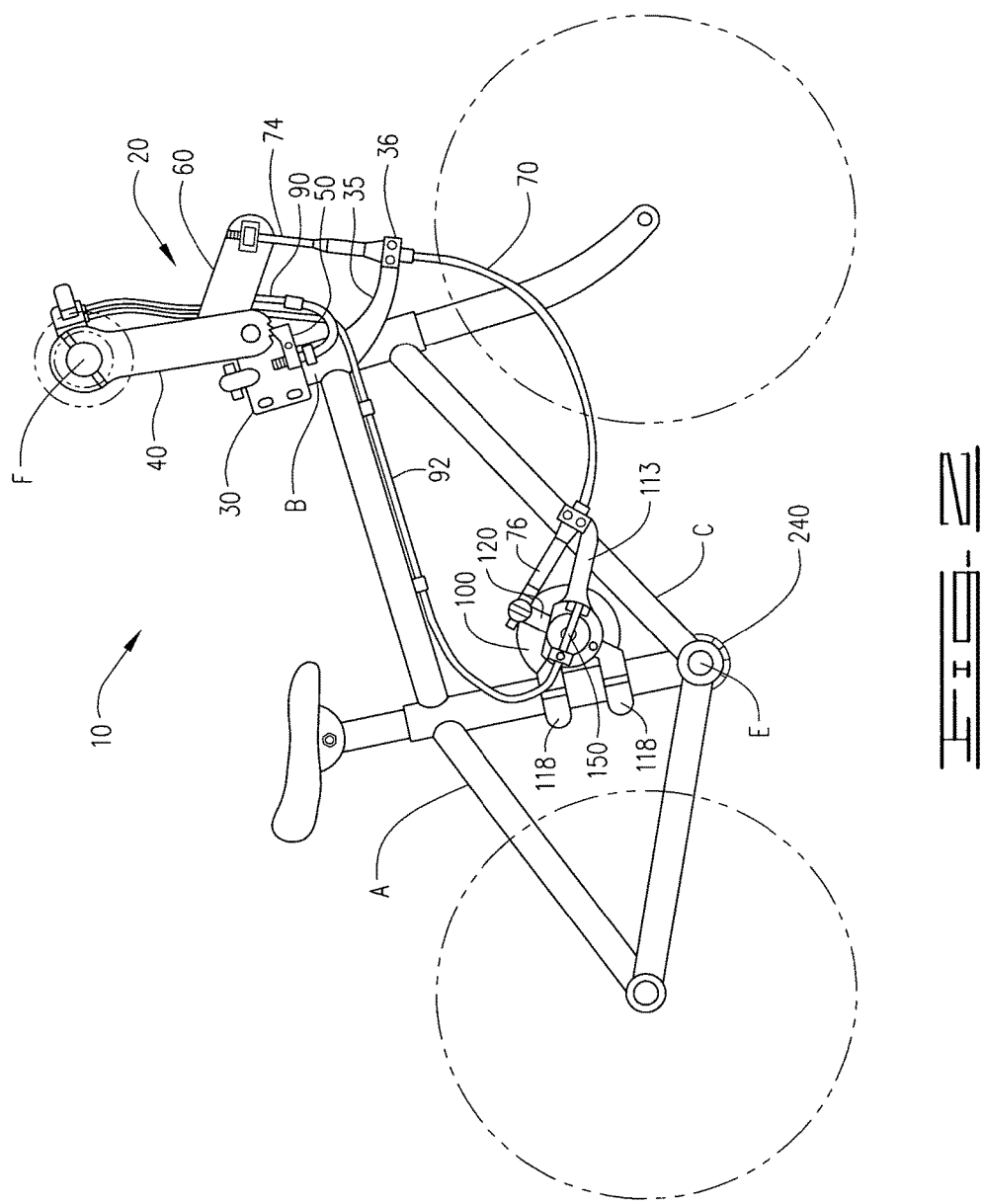
FIG. 2 is a side view of the secondary handlebar drive apparatus with phantom line indicating placement relative to non-modified bicycle components.

The supplemental drive assembly 200 defines an output drive sprocket 210 attached to the extending output end 134 of the transmission axle 130, FIGS. 2 and 4. This output drive sprocket 210 is further connected to a supplemental pedal sprocket 230 which is integrated with the pedal axle E of the bicycle A by a secondary drive chain 240. It is preferred that the output drive sprocket 210 be larger in diameter than the supplemental pedal sprocket 230 to coordinate the pedal D speed and the handlebar assembly 20 movement. A tensioner pulley 222 attached to a tensioner arm 220 is attached to the bicycle frame C to maintain a tension on the secondary drive chain 240. As indicated in FIG. 2, this secondary drive assembly 200 applies additional force from the reciprocating handlebar drive 10 in addition to the pedal drive of the bicycle, combining the handlebar movement and the pedal movement together to compel the bicycle. When desired, the reciprocating handlebar drive 10 is activated by a bicycle rider, and when not desired, the clutch lever 84 is moved to engage the handlebar clutch arm 50 and depress the clutch pin 140 contemporaneously, deactivating the reciprocating handlebar drive 10. This provides the option to operate the bicycle in a conventional manner, using only the pedals, or applying use of the upper body to operate the reciprocating handlebar drive, especially handy during times of difficult operation, such as climbing a hill or on flat straightaway roads where an additional body workout is desired. A secondary implication of the "inactive" position is that the pedals D are allowed to move backwards, since the transmission axle 130 is disengaged and freely rotating, while the "active" position, at which time the transmission assembly 100 is engaged, prevents backwards movement of the pedals D.

Although the embodiments of the secondary drive apparatus for a bicycle have been described and shown above, it will be appreciated by those skilled in the art that numerous modifications may be made therein without departing from the scope of the invention as herein described.

What is claimed is:

1. A reciprocating handlebar auxiliary drive apparatus for a bicycle or other human propelled pedal driven vehicle, produced by a push and pull motion upon a bicycle handlebar assembly to supplement a primary pedal drive on the bicycle, the reciprocating handlebar auxiliary drive apparatus comprising:

said handlebar assembly providing a base block attached to a vertical stem of the bicycle which supplies turning movement for the bicycle, at least one drive lever defining a lower end attaching through a transverse drive lever bore within said base block by a rocker pin, said at least one drive lever defining an upper end attaching said bicycle handlebars, said at least one said drive lever defining clutch teeth at said lower end and said at least one said drive lever extending a forward drive arm;

a transmission assembly attaching upon a frame of said bicycle, said transmission assembly defining an input housing member with an axle bore, an output housing with an axle bore, a transmission axle defining an input end extending through said axle bore of said input housing, an output end extending through said axle bore of said output housing, and a gear drive lever attaching within said input housing to an input drive gear, said input drive gear attaching to said transmission axle by a bearing, said transmission axle further attaching an output drive gear, wherein said gear drive lever is pushed, said transmission axle is compelled to rotate in one direction and wherein said gear drive lever is pulled, said transmission axle is compelled to rotate in said same direction as was said gear drive lever when pushed;

a reciprocating drive cable defining an outer cable sleeve, said drive cable defining a first end and a second end, said first end attached to said drive lever and said second end attached to said gear drive lever, wherein said handlebar assembly is pushed and pulled, said reciprocating drive cable is pushed and pulled through said outer cable sleeve, forcing said second end, attached to said gear drive lever for be pushed and pulled, in turn rotating said transmission axle of said transmission assembly in a singular direction; and a supplemental drive assembly defining an output drive sprocket attached to said output end of said transmission axle attached by a secondary drive chain to a supplemental pedal sprocket attached to a pedal axle of said bicycle, said secondary drive assembly receiving auxiliary power from said reciprocating handlebar assembly to supplement said pedals of said bicycle for additional compelling drive power.

2. The reciprocating handlebar drive assembly of claim 1, further comprising:

a clutch assembly defining a clutch mounting base with a handlebar clutch arm bore secured to said bicycle handlebars extending a clutch lever which is moved between an active position and an inactive position, said clutch lever attaching a handlebar clutch cable and a transmission clutch cable;

a handlebar clutch arm pivotally attached to said base block by a clutch arm pin, said handlebar clutch arm defining a pawl and connecting said handlebar clutch cable, wherein said clutch lever is in said active position, said pawl of said handlebar clutch arm engages said clutch teeth at said lower end of said at least one drive lever, prohibiting movement of said handlebar assembly and when said clutch lever is in said inactive position, said pawl does not engage said clutch teeth, allowing said handlebar assembly reciprocating motion;

a transmission clutch arm attached to said input housing by a clutch arm hinge, said transmission clutch arm defining an inner margin and a transmission clutch cable attachment, said transmission clutch arm pivoting outward when said clutch lever is in said active position and pressed inward when said clutch lever is in said inactive position; and said transmission axle defines a transverse bore within said input end receiving a clutch pin urged outward from said transverse bore by a clutch spring to expose a clutch pin extension beyond the input end of said transmission axle, said clutch pin allowing engagement of said transmission assembly when said clutch pin extension is extended, and bypassing engagement of said transmission assembly when said clutch pin extension is depressed by said inner margin of said transmission clutch arm against said clutch pin extension when said clutch lever is in said inactive position, said clutch pin disengaging said transmission assembly and said secondary drive assembly from operation, thereby leaving said bicycle to operate without said reciprocating handlebar drive assembly by pedal movement only.

3. The reciprocating handlebar drive assembly of claim 1, wherein:

said first end of said reciprocating drive cable is anchored to said drive arm of said handlebar assembly by an upper drive cable clamp and said cable sleeve attaches to said handlebar drive assembly by a lower cable stabilizer arm by a cable sleeve clamp maintaining the sleeve stationary while allowing reciprocating movement of said drive cable;

said second end of said reciprocating drive cable is attached to said drive lever extension of said gear drive lever by a drive cable connector and said cable sleeve is attached to a cable sleeve arm extending from said input housing member; and said movement of said drive arm during reciprocating movement of said handlebar assembly is equal to said movement of said gear drive lever of said transmission assembly, wherein said movement of said reciprocating drive cable is the same distance within said first end and said second end.

4. The reciprocating handlebar drive assembly of claim 1, wherein said transmission assembly function of elements converts said reciprocating motion of said drive cable compelled by said reciprocating movement of said reciprocating handlebar assembly into a uniform directional rotational motion utilized by said supplement drive assembly thereby converting said push-pull motion acting on one side of said transmission assembly into a singular direction rotational motion of said transmission axle across said transmission assembly to which is attached said supplemental drive assembly.

* * * * *